(12) United States Patent
Meyer

(10) Patent No.: US 6,348,249 B2
(45) Date of Patent: *Feb. 19, 2002

(54) SHEET MATERIAL

(75) Inventor: Scott R. Meyer, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/802,243

(22) Filed: Mar. 8, 2001

Related U.S. Application Data

(63) Continuation of application No. 08/189,314, filed on Jan. 31, 1994, now Pat. No. 6,228,449.

(51) Int. Cl.$^7$ .................................................. C09J 7/02
(52) U.S. Cl. .................... 428/41.8; 428/40.1; 428/41.3; 428/41.5; 428/41.7; 428/218; 428/219; 428/220; 428/343; 428/352; 428/354; 428/355; 428/516; 428/517; 428/518; 428/906
(58) Field of Search ............................. 428/40.1, 41.3, 428/41.5, 41.7, 41.8, 218, 219, 220, 343, 352, 354, 355, 516, 517, 518, 906; 156/244.11

(56) References Cited

U.S. PATENT DOCUMENTS

| RE24,906 E | 12/1960 | Ulrich | 206/59 |
|---|---|---|---|
| 3,169,945 A | 2/1965 | Hostettler et al. | 260/78.3 |
| 3,786,116 A | 1/1974 | Milkovich et al. | 260/885 |
| 3,842,059 A | 10/1974 | Milkovich et al. | 260/93.5 A |
| 4,181,752 A | 1/1980 | Martens et al. | 427/54.1 |
| 4,339,485 A | 7/1982 | Shibano | 428/40 |
| 4,425,176 A | 1/1984 | Shibano | 156/244.11 |
| 4,444,806 A | 4/1984 | Morgan et al. | 427/45.1 |
| 4,746,713 A | 5/1988 | Janowicz | 526/170 |
| 4,769,283 A | 9/1988 | Sipinen et al. | 428/343 |
| 4,859,511 A | 8/1989 | Patterson et al. | 428/40 |
| 4,937,299 A | 6/1990 | Ewen et al. | 526/119 |
| 5,028,677 A | 7/1991 | Janowicz | 526/329.7 |
| 5,086,088 A | 2/1992 | Kitano et al. | 522/170 |
| 5,169,728 A | 12/1992 | Murphy et al. | 428/516 |
| 5,183,867 A | 2/1993 | Welborn, Jr. | 526/114 |
| 5,191,042 A | 3/1993 | Cozewith | 526/144 |
| 5,206,075 A | 4/1993 | Hodgson | 428/216 |
| 5,264,530 A | 11/1993 | Darmon et al. | 526/194 |
| 5,290,633 A | 3/1994 | Devlin et al. | 428/423.1 |

FOREIGN PATENT DOCUMENTS

| EP | 0 460 841 | 12/1991 |
|---|---|---|
| GB | 676559 | 7/1952 |
| JP | 61103976 | 5/1986 |
| JP | 63[1988]-85642 | 6/1988 |
| JP | 1[1989]-44225 | 9/1989 |
| JP | 05078628 | 3/1993 |
| WO | WO 93/06182 | 4/1993 |

OTHER PUBLICATIONS

Shell Chemical Company, Development Product Technical Bulletin SC:861–87, DURAFLEX® Polybutylene 8310.
Shell Chemical Company, Technical Bulletin SC:514–87, DURAFLEX® Polybutylene 8240.
Shell Chemical Company, Technical Bulletin SC:269–87, DURAFLEX® Polybutylene 0200.
"Exact™ Polymers for Wire and Cable Applications," Exxon Chemical, Feb. 1, 1992 (1 page).
Schwank, "Single–site metallocene catalysts yield tailor–made polyolefin resins," *Modern Plastics*, Aug. 1993, pp. 49–50.
Leaversuch, "Add very low density PE to the list of options in polyolefin resins", *Modern Plastics*, Jul. 1992, pp. 48–50.

*Primary Examiner*—Nasser Ahmad
(74) *Attorney, Agent, or Firm*—Harold C. Knecht III

(57) ABSTRACT

A sheet material comprising i) a pressure-sensitive adhesive film comprising an acrylic pressure-sensitive adhesive polymer, and ii) a release film comprising a polyolefin polymer having a density of no greater than 0.90 g/cc, the pressure-sensitive adhesive film being in contact with the polyolefin polymer.

12 Claims, No Drawings

SHEET MATERIAL

CROSS REFERENCE TO RELATED APPLICATIONS

This application is a continuation of U.S. patent application Ser. No. 08/189,314, filed Jan. 31, 1994 now U.S. Pat. No. 6,228,449.

FIELD OF THE INVENTION

This invention relates to a release liner for pressure sensitive adhesive tapes.

BACKGROUND OF THE INVENTION

Release coatings are well known in the pressure sensitive adhesive tape industry to provide a release surface so that a tape can be unwound from a roll without the adhesive sticking to the backside of the tape. The release coating can also be coated onto a liner which serves as a carrier for a pressure sensitive adhesive transfer tape or a double coated tape, both of which are tacky on both sides of the tape.

Materials commonly used for release surfaces and coatings are silicone compositions because they can be formulated to provide varying levels of release from a "premium" release (i.e., the force to unwind the tape is very low) to a "low adhesion backsize" release which typically requires a greater force to unwind.

The primary deficiency of silicone release coatings is the potential contamination that may be associated with them. When workers handle a silicone release coated tape or liner, silicone can transfer to their hands, work gloves, or clothing. The silicone can be further transferred from their hands to surfaces to be painted, and cause problems such as poor adhesion of the paint to the contaminated surface, and nonwetting of the paint in areas where the silicone is present on the surface. Silicone release materials also tend to be costly, and silicone coated materials may be difficult to recycle.

Polyethylene has also been used as a release material and can be coated onto Kraft papers for a release liner or it can be used as a single layer film, or a multi-layer film with polyethylene co-extruded with or laminated to a base layer such as high density polyethylene, and the like. Higher density polyethylenes are limited in use to certain adhesives and are found to be unsuitable for very aggressive pressure sensitive adhesives because the adhesion between the polyethylene and the adhesive is so high that it can be difficult to start removing the liner. Since the release force is high, the adhesive and/or the liner can also be damaged as one tries to separate the adhesive from the liner.

There remains an ongoing need for controlled release liners for pressure sensitive adhesives that do not have a silicone release layer.

BRIEF SUMMARY OF THE INVENTION

The present invention provides a novel sheet material comprising i) a pressure-sensitive adhesive film comprising an acrylate-based pressure-sensitive adhesive polymer; and ii) a release film comprising a first layer comprising polyolefin polymer having a density of no greater than about 0.90 g/cc and a CDBI of greater than about 70 percent, the pressure-sensitive adhesive film being in contact with the first layer of the release film.

In a preferred embodiment there is provided a sheet material which is substantially free of any silicone release coating.

In another preferred embodiment the release film comprises a second layer which is preferably a polybutylene.

DETAILED DESCRIPTION

In the practice of the invention, the materials useful for the first layer of the release film are copolymers of ethylene and alpha-olefins having from 3 to about 10 carbon atoms. Suitable alpha-olefins include butene-1, hexene-1, octene-1, and combinations thereof. Copolymers of ethylene and butene-1 are preferred for use with acrylate-based pressure sensitive adhesives.

The copolymers are generically described as very low density polyethylene (VLDPE) and have been described as "plastomers", a polymer having thermoplastic and elastomeric characteristics. Preferred copolymers have a density no greater than 0.90 grams per cubic centimeter (g/cc). More preferred are copolymers having a density of no greater than 0.89 g/cc and most preferred are those having a density no greater than 0.88 g/cc. Lower density copolymers are found to provide a lower release value, and values can be changed by blending copolymers of varying types.

The useful copolymers preferably have a narrow molecular weight distribution as defined by having a polydispersity of between about 1 and 4, and more preferably between about 1.5 and 3.5. Polydispersity is defined as the ratio of the weight average molecular weight to the number average molecular weight.

The useful copolymers can be defined by a parameter which has been characterized as the "composition distribution breadth index" (referred to hereinafter including the claims as "CDBI"). The CDBI is defined as the weight percent of the copolymer molecule, having a comonomer content within 50 percent (i.e., ±50%) of the median total molar comonomer content. The CDBI and the method for its determination is described in U.S. Pat. No. 5,206,075, incorporated herein by reference. The CDBI of suitable copolymers for use in this invention is preferably greater than about 70 percent, more preferably is greater than about 80 percent, and most preferably is greater than about 90 percent.

Suitable copolymers are commercially available from Exxon under the EXACT tradename. These copolymers form films that are not fusible at ambient temperature, and will not block, i.e., stick to underlying layers, when the film is wound into a roll.

In a preferred embodiment of the first layer of the release liner consists essentially of the copolymer having a density of no greater than 0.90 g/cc, and is substantially free of any polyethylene having a density of 0.91 g/cc or greater.

As used herein, the terms release liner, liner, and release films will be used interchangeably. The release film can be prepared by extruding the copolymers as a single self supporting film where there is no second layer present. The film thickness may range from about 0.1 millimeter to about 0.4 millimeters, although the thickness will generally depend upon considerations such as the strength needed in the release liner, ease of handling the film, flexibility needed for the liner, and the like.

The release film may also be prepared by extruding the copolymer onto a base material, or by co-extruding the copolymer with one or more other polymers to form multi-layer films to provide additional strength and/or stiffness. Examples of suitable base materials include cellulosic materials such as paper, woven nonwoven fabrics, films such as nylon, polyester, polyolefins, acrylonitrile butadiene styrene, and sheet materials made of materials such as metal, ceramic, or plastic. The copolymer film can also be attached to the base material using an appropriate laminating adhesive. The base material can also be a sheet material suitable for thermoforming or vacuum forming so that trays can be formed having a release surface for holding pressure sensitive adhesive coated parts.

The thickness of the copolymer film on a base layer should be sufficient to provide the desired release force, and may be less than for a self-supporting sheet.

The films are typically extruded onto chill rolls having various surfaces such as a matte finish or a smooth finish to provide matte or glossy surfaces on the release liner. Chill rolls can be treated or coated with materials to prevent sticking of the extrudate to the roll surface, such as Teflon™ or a plasma coating. Silicone rubber rolls may also be used for this purpose. The extruded films can also be extruded between a chill roll and a smooth polyester film to provide a glossy surface on one side and a matte surface on the other side, or between two polyester liners for two glossy surfaces.

Multi-layer films may be prepared by known co-extrusion processes. Other polymers that can be co-extruded with the copolymer include polyolefins such as polypropylene, polyethylene, polybutylene, and mixtures thereof, and polyesters. Co-extrusion with polyolefins is especially useful for making recyclable or re-usable liners.

In a multi-layer film construction, the polymers and co-polymers can be selected to exhibit differential release, i.e., the pressure sensitive adhesive will release from one side with a noticeably lower force than from the other side.

Preferred polymers for co-extrusion with the copolymer of the first layer is polybutylene homopolymers and copolymers. Polybutylene homopolymers are especially preferred in the second layer of the release film because they provide strength to the film and also serves as a high differential release liner. A useful homopolymer for employment in the base layer or second layer of the release film is polybutylene. Useful polybutylene hompolymers and copolymers are available from Shell Chemical Co. under the DURAFLEX tradename. Acrylate-based pressure sensitive adhesives were observed to have a higher release force from the polybutylene surface than from the polyethylene copolymer surface.

In some applications it is desirable to have a liner width slightly greater than the width of the pressure sensitive adhesive. This is especially true of thicker pressure sensitive adhesives, i.e. greater than about 0.5 millimeters which may flow slightly when wound in a roll and the greater width helps to prevent adhesive from flowing out onto the adjacent wrap of tape and causing blocking of the tape.

For these applications, it is preferred to use a base material or co-extruded material that will form a film which when stressed for a short time, i.e., less than about a second, the film will recover less than 100% of its stretch. For example, if a film having a length of 1.0 cm is stretched to a length of 2.0 cm and released, the film will recover to a length greater than 1.0 cm.

In a typical process to make pressure sensitive adhesive transfer tapes, an adhesive composition is coated onto a release liner. The adhesive is then cured to form a gelled film on the liner, and the release liner with the adhesive is rolled up into a large roll. Alternatively, the adhesive may be coated and cured on one liner, and then transferred onto a different liner before converting. The adhesive coated sheet is then converted into narrow rolls by slitting the large roll and winding the narrow width tape onto cores for customer use.

During converting of thick sheets, i.e., greater than about 0.5 mm, the slitting knife or razor blade penetrates the sheet material from the backing side. As the knife penetrates the liner and adhesive, the width of the knife exerts sufficient forced to stretch both the liner and adhesive. After slitting, the adhesive being elastic in nature, shrinks back to the slit width, while the liner recovers less than 100% so that it is slightly wider than the adhesive.

It has been found that polybutylene homopolymers and polybutylene copolymers comprising a minor amount (i.e., no more than five percent) of a comonomer such as ethylene, in the second layer of the release film are particularly preferred to provide a film having low stress recovery. Without wishing to be bound by theory, the polybutylene apparently strain crystallizes when it is stressed or stretched during slitting and the crystallization prevents recovery of the stretch. The liners of the invention are useful as release films for acrylate-based pressure sensitive adhesives. Such adhesives include homopolymers and copolymers of monofunctional unsaturated acrylic or methacrylic acid ester monomers of non-tertiary alcohols having from about 1 to 20 carbon atoms, and preferably from 4 to 12 carbon atoms. A comonomer may optionally by included to improve the cohesive strength of the adhesive. Comonomers useful in making the copolymers typically have a higher homopolymer glass transition temperature than the glass transition temperature of the acrylic acid ester homopolymer.

Suitable acrylic acid ester monomers include 2-ethylhexyl acrylate, isooctyl acrylate, isononyl acrylate, n-butyl acrylate, decyl acrylate, dodecyl acrylate, and mixtures thereof. Preferred monomers include isooctyl acrylate, n-butyl acrylate, and mixtures thereof.

Useful reinforcing comonomers include acrylic acid, methacrylic acid, itaconic acid, acrylamide, substituted acrylamides, N-vinyl pyrrolidone. N-vinyl caprolactam, isobornyl acrylate, and cyclohexyl acrylate. Preferred comonomers include N-vinyl caprolactam, substituted acrylamides such as N,N-dimethylacrylamide, and isobutyl acrylate.

Suitable initiators are used to make pressure adhesives in the practice of the invention. The types and amounts initiators are used in amounts suitable to effect the type of polymerization used, e.g., photoinitiators such as benzil dimethyl ketal can be used in amounts from about 0.1 to about 5 parts per hundred parts of monomer for ultraviolet light photopolymerized adhesives, and 2,2'-azobis (isobutryonitrile) may be used for solvent polymerization in amounts of from about 0.1 parts to about 2 parts per hundred parts of monomer.

The pressure sensitive adhesives may also include additives such as cross-linking agents, fillers, gases, blowing agents, glass or polymeric microspheres, silica, calcium carbonate fibers, surfactants, and the like. The additives are included in amounts sufficient to effect the desired properties.

The pressure sensitive adhesives may also contain thermosettable resins such as epoxies and urethanes, which can be heat cured after the pressure sensitive adhesive tape has been applied to a surface to form a thermosetting adhesive.

The pressure sensitive adhesives may be prepared by methods that are known in the industry, including solvent polymerization, radiation polymerization by such means as electron beam, gamma radiation, and ultraviolet radiation, emulsion polymerization, and the like. Methods of making pressure sensitive adhesives, for example, are disclosed in U.S. Pat. No. Re 24,906 (Ulrich).

The following non-limiting examples serve to illustrate specific embodiments of the invention.

TEST PROCEDURES

Release Force at 90° Peel Angle

The release liner film is cut into strips measuring 2.54 cm by 40.64 cm. The pressure sensitive adhesive sample is laminated onto a 5.08 cm wide by 30.48 cm long metal plate. The release liner film is then laminated to the adhesive using 2 passes with 6.8 kilogram roller. The sample is then aged at room temperature (21° C.) for 3 hours. The samples are then placed in a peel adhesion tester and the release liner is removed at a 90° peel angle at peel rates of 228.6 centimeters/minute (cm/min) and 30.48 cm/min. Results are recorded in grams per 2.54 centimeter width (g/2.54 cm).

EXAMPLES 1–3

Release films were prepared by extruding low density copolymer films of ethylene and butene-1 to a thickness of about 0.11 millimeter. The copolymers used are shown in Table 1. Extrusion was done using a 1.905 cm single screw extruder with a 25:1 L/D and a 20.32 cm wide die. Die temperatures were maintained at about 204° C., with melt temperatures ranging from about 182° C. to 193° C. The film was extruded between a two untreated polyester films to produce a film with two glossy surfaces. The release liners were tested for adhesion to an acrylate pressure sensitive adhesive made by solvent polymerization as described in U.S. Pat. No. Re. 24906 (Ulrich) and having a composition of 90 parts isooctyl acrylate to 10 parts acrylic acid. Release values are shown in Table 1.

Comparative Example C-1

A silicone coated release paper was tested on the same adhesive as Examples 1–3. Results are shown in Table 1.

TABLE 1

| Ex | Copolymer Identification | Copolymer Density g/cc | Release Force (g/2.54 cm) | |
|---|---|---|---|---|
| | | | 228.6 cm/min | 30.48 g/min |
| 1 | EXACT 3022 | 0.905 | 31.3 | 43.1 |
| 2 | EXACT 4003 | 0.895 | 24.9 | 22.0 |
| 3 | EXACT4006 | 0.880 | 14.6 | 9.4 |
| C | Silicone Liner | — | 45.7 | 41.1 |

* The samples peeled at 228.6 cm/min., and were then re-laminated, aged for 30 minutes, and tested at 30.48 cm/min.

EXAMPLE 4

A release liner was prepared by coextruding a film having a 0.051 millimeter thick layer of an ethylene-butene copolymer having a density of 0.88 g/cc (EXACT™ 4006 from Exxon Chemical) and a 0.127 millimeter thick layer of polybutylene (Duraflex™200 from Shell Chemical Co.). Both layers included 2% by weight of a red pigment (#150020 from AMPACET). A single screw extruder was used for each of the film components. Barrel temperatures for the polybutylene were of 149° C., 177° C., and 204° C., and barrel temperatures for the copolymer were 171° C., 182° C., and 193° C. The die temperature was maintained at about 204° C. The film was extruded between a smooth polyester film and a Teflon™coated roll to provide a matte finish on the copolymer side, and a glossy surface on polybutylene side of the release film.

A two layer tape construction was prepared as follows. A first composition was prepared by mixing the following:

80 parts butyl acrylate
20 parts N,N,-dimethylacrylamide
20 parts diglycidyl ether of bisphenol A (Epon™828 from Shell Chemical Co.)
80 parts diglycidyl oligomer of bisphenol A (Epon™1001 from Shell Chemical Co.)
5 parts polycaprolactone (Tone™P676 from Union Carbide)
0.05 parts hexanedioldiacrylate
0.16 parts benzil dimethyl ketal (ESCACURE™KB-1 available from Sartomer)
0.6 parts blowing agent (Vazo™88 from DuPont Co.)
0.15 part 3-glycidoxylpropyltrimethoxysilane
1.2 parts micronized hexakis (imidazole) nickel phthalate
0.4 part carbon tetrabromide
0.1 part antioxidant (Irganox™1010 from Ciba Geigy)
2.8 parts micronized dicyandiamide (DYHARD™100 from SKW Chemical)
4.0 parts glass bubbles (C15-250 from Minnesota Mining & Manufacturing Co.)
4.0 parts silica (Cab-O-Sil M5 from Cabot Corp.)

The composition was degassed and coated between two transparent silicone release treated polyester films to a thickness of 0.51 millimeter. The coated composition was then irradiated on both sides of the web with ultraviolet lamps having 90% of the emissions between 300 to 400 nanometers (nm), and a maximum at 351 nm to form a sheet. The intensity and total energy above the web were 2.19 mW/cm$^2$ and 114 mJ/cm$^2$. respectively. The intensity and total energy below the web were 2.04 mW/cm$^2$ and 106 mJ/cm$^2$, respectively.

A second composition was prepared by heating 40 parts butyl acrylate with 40 parts N-vinyl caprolactam to about 50° C. to form a solution. The following were then added to the solution: 20 parts butyl acrylate, 80 parts hydrogenated diglycidyl ether of bisphenol A (Eponex™1510 from Shell Chemical Co.), 80 parts methyl methacrylate/butyl methacrylate copolymer (Acryloid™60 from Rohm & Haas), 0.14 part benzil dimethyl ketal, 6 parts dicyandiamide, 3 parts 2,4-diamino-6[2'-methylimidazolyl-(1')]ethyl-s-triazine (Curezol™™ 2MZ Azine from Air Products), and 4.5 parts Cab-O-Sil™M5 silica. The composition was then degassed. One of the polyester films was removed from the above-described sheet made from the first composition and the degassed second composition was coated onto the sheet to a thickness of 1.524 millimeters. The coated composition was covered with a silicone coated polyester film and the web was then irradiated as described above. Intensity and total energy above the web were 2.25 mW/cm$^2$ and 458 mJ/cm$^2$, and 2.09 mW/cm$^2$ and 426 mJ/cm$^2$ below the web, respectively. The polyester liners were removed and the tape was laminated to the release liner with the layer of the first composition in contact with the copolymer surface, and the layer of the second composition in contact with the polybutylene surface.

The sheet was converted by slitting into tapes that were about 1.8 cm wide. The release liner stretched in width during slitting and did not recover the stretch. The resulting roll of tape had a slight overhang of about 0.79 mm if liner on each side of the slit adhesive.

Adhesion of the tape to the polybutylene side was 36.0 grams/2.54 cm, and 16.7 on the copolymer side when peeled at 30.48 cm/min.

EXAMPLE 5

A two-layered tape was prepared as in Example 4 except that the first composition of Example 4 was coated to a thickness of 0.762 millimeters to form the first layer. The first layer was cured using the above-described ultraviolet lamps with a total energy and intensity above the web of 170 mJ/cm² and 2.27 mW/cm³, respectively, and below the web of 133 mJ/cm² and 1.77 mW/cm², respectively.

The second composition, as described in Example 4, was coated to a thickness of 1.524 millimeters over the cured first layer. The two-layered tape was cured as described above with a total energy and intensity above the web of 538 mJ/cm² and 2.34 mW/cm² and below the web of 482 mJ/cm² and 2.10 mW/cm³, respectively. The cured two-layered tape was laminated to a release liner according to Example 4.

The two-layered tape of this Example is particularly useful in automobile roof ditch sealing applications as is described in copending application U.S. Ser. No. 08/036,463 which was filed on Mar. 24, 1993, and is commonly assigned, incorporated herein by reference.

What is claimed is:

1. A sheet material comprising i) a pressure-sensitive adhesive film comprising an acrylate-based pressure-sensitive adhesive polymer; and ii) a release film comprising a first layer comprising a polyolefin polymer having a density of no greater than 0.90 g/cc and a CDBI of greater than about 70 percent, said pressure-sensitive adhesive film being in contact with said first layer of said release film.

2. A sheet material according to claim 1, wherein said polyolefin polymer has a density of no greater than 0.89 g/cc.

3. A sheet material according to claim 1, wherein said polyolefin polymer has a density of no greater than 0.88 g/cc.

4. A sheet material according to claim 1, wherein said polyolefin polymer is a copolymer of ethylene and at least one other monomer which is an alpha-olefin.

5. A sheet material according to claim 4, wherein said alpha-olefin is butene-1.

6. A sheet material according to claim 1, wherein said first layer is substantially free of a polyethylene polymer having a density of 0.91 g/cc or greater.

7. A sheet material according to claim 1, wherein said first layer consists essentially of said polyolefin polymer.

8. A sheet material according to claim 1, substantially free of a silicone release coating.

9. A sheet material according to claim 1, wherein said release film further comprises a second layer comprising a polybutylene polymer.

10. A sheet material according to claim 9, wherein said first layer and said second layer of said release film are coextruded.

11. A sheet material according to claim 1, in the form of a convolutely wound roll.

12. A sheet material according to claim 1, wherein said release film further comprises a second layer comprising a polybutylene homopolymer or a polybutylene copolymer comprising no more than about 5% by weight of a comonomer.

* * * * *